(12) United States Patent
Moon

(10) Patent No.: US 10,868,297 B2
(45) Date of Patent: Dec. 15, 2020

(54) SECONDARY BATTERY COMPRISING A CARBON-SILICON COMPOSITE ELECTRODE AND METHOD OF PREPARING SAME

(71) Applicant: Sogang University Research Foundation, Seoul (KR)

(72) Inventor: Jun Hyuk Moon, Seoul (KR)

(73) Assignee: SOGANG UNIVERSITY RESEARCH FOUNDATION, Seoul (KR)

( * ) Notice: Subject to any disclaimer, the term of this patent is extended or adjusted under 35 U.S.C. 154(b) by 96 days.

(21) Appl. No.: 15/441,575

(22) Filed: Feb. 24, 2017

(65) Prior Publication Data

US 2017/0170458 A1    Jun. 15, 2017

Related U.S. Application Data

(63) Continuation of application No. PCT/KR2015/008883, filed on Aug. 25, 2015.

(30) Foreign Application Priority Data

Aug. 25, 2014    (KR) ........................ 10-2014-0110990

(51) Int. Cl.
*H01M 4/1393* (2010.01)
*H01M 10/0525* (2010.01)
(Continued)

(52) U.S. Cl.
CPC ......... *H01M 4/1393* (2013.01); *H01M 4/043* (2013.01); *H01M 4/0471* (2013.01); *H01M 4/133* (2013.01); *H01M 4/134* (2013.01); *H01M 4/1395* (2013.01); *H01M 4/364* (2013.01); *H01M 4/386* (2013.01); *H01M 4/583* (2013.01);
(Continued)

(58) Field of Classification Search
CPC ....... H01M 10/0525; H01M 2004/021; H01M 2220/30; H01M 4/043; H01M 4/0471; H01M 4/133; H01M 4/134; H01M 4/1393; H01M 4/1395; H01M 4/364; H01M 4/386;
(Continued)

(56) References Cited

U.S. PATENT DOCUMENTS 9,368,801 B2 * 6/2016 Moon ................. H01M 4/8657
2013/0273460 A1 * 10/2013 Moon ................. H01M 4/8657
429/532

FOREIGN PATENT DOCUMENTS

JP    2000195507 A    7/2000
KR    20130056668 A    5/2013
(Continued)

OTHER PUBLICATIONS

Nishimura et al., Manufacture of Negative Electrode for Nonaqueous System Secondary Battery, machine translation from Japan Platform for Patent Information; Jul. 2000 (Year: 2000).*

(Continued)

*Primary Examiner* — Adam A Arciero
(74) *Attorney, Agent, or Firm* — Fox Rothschild LLP

(57) ABSTRACT

The present disclosure relates to a method of preparing a carbon-silicon composite electrode material including silicon nanoparticles and an inverse opal-structured porous carbon structure, the carbon-silicon composite electrode material prepared by the method, and a secondary battery including the carbon-silicon composite electrode material.

12 Claims, 5 Drawing Sheets

(51) Int. Cl.
  *H01M 4/587* (2010.01)
  *H01M 4/38* (2006.01)
  *H01M 4/1395* (2010.01)
  *H01M 4/36* (2006.01)
  *H01M 4/04* (2006.01)
  *H01M 4/133* (2010.01)
  *H01M 4/583* (2010.01)
  *H01M 4/62* (2006.01)
  *H01M 4/02* (2006.01)
  *H01M 4/134* (2010.01)

(52) U.S. Cl.
  CPC ........... *H01M 4/587* (2013.01); *H01M 4/622* (2013.01); *H01M 4/624* (2013.01); *H01M 10/0525* (2013.01); *H01M 4/621* (2013.01); *H01M 4/625* (2013.01); *H01M 2004/021* (2013.01); *H01M 2220/30* (2013.01)

(58) Field of Classification Search
  CPC ...... H01M 4/583; H01M 4/587; H01M 4/621; H01M 4/622; H01M 4/624; H01M 4/625
  See application file for complete search history.

(56) References Cited

FOREIGN PATENT DOCUMENTS

| KR | 20130071070 A | 6/2013 | |
|---|---|---|---|
| KR | 20130098234 A | 9/2013 | |
| KR | 20140026633 A | 3/2014 | |
| WO | WO-2012036349 A1 * | 3/2012 | .......... H01M 4/8657 |

OTHER PUBLICATIONS

Moon et al., Porous Carbon Structure, Method using the Same, Anode Active Material Comprising the Structure, Lithium Ion Battery using the Same, and Preparation Method thereof, KR 20130098234A; Espacenet Machine Translation, Sep. 4, 2013 (Year: 2013).*

Badi et al., "Low-cost carbon-silicon nanocomposite anodes for lithium ion batteries," Nanoscale Research Letters (2014); 9:360 (8 pages).

* cited by examiner

SECONDARY BATTERY COMPRISING A CARBON-SILICON COMPOSITE ELECTRODE AND METHOD OF PREPARING SAME

CROSS-REFERENCE TO RELATED APPLICATIONS

This application is a continuation of PCT Application No. PCT/KR2015/008883, filed on Aug. 25, 2015, which claims priority to Korean Patent Application Number 10-2014-0110990, filed on Aug. 25, 2014, both of which are hereby incorporated by reference in their entirety.

TECHNICAL FIELD

The invention relates to a method of preparing a carbon-silicon composite electrode material including silicon nanoparticles and an inverse opal-structured porous carbon structure, the carbon-silicon composite electrode material prepared by the method, and a secondary battery including the carbon-silicon composite electrode material.

BACKGROUND

Lithium-ion batteries are being developed initially for small-sized electronic devices and portable IT devices as noticeable energy storage systems to store new renewable energy such as solar heat, wind power, and tidal power. The lithium-ion batteries with high capacity and long lifespan can be applied to middle and large-sized batteries and also have emerged as the core technology for electronic devices with a recent explosive increase in demand for portable IT devices such as smartphones and tablet PCs. The lithium-ion batteries have high capacity as an advantage but have poor lifespan and output characteristics, and, thus, it is necessary to solve this problem, and studies are currently in progress in various manners.

Recently, graphite and lithium metal oxides such as lithium cobalt oxide and lithium manganese oxide or lithium iron phosphate are being used commercially for an electrode applied to a lithium-ion battery. Further, in order to improve lifespan and output characteristics while maintaining high capacity, the development of an alloy-type electrode is also being actively studied.

Meanwhile, silicon has an electrochemical reduction potential of 0.4 V and a high capacity of 4,200 mAh/g and thus is one of materials highly favored as new anode materials. Silicon has very high capacity, but undergoes a charge and discharge process unlike a carbon-based anode with more than 300% volume expansion and contraction. The huge change in volume of silicon forms an unstable surface electrolyte interface (SEI) and causes secession from a current collector, resulting in a short lifespan and a decrease of capacity. Further, a lithium ion diffusion velocity of a silicon material is low due to a low electric conductivity of silicon, which has a bad effect on a rate capability of silicon. Therefore, a method for obtaining a long lifespan and a high capacity by mitigating such a sharp volume change and an improvement in rate capability through a short ion transfer distance by manufacturing a high-surface area structure have been continuously studied.

A nano-sized carbon structure material which has been widely used for a composite with silicon has a high electric conductivity, a large surface area, and a thermal and chemical stability and thus improves a rate capability of silicon. Further, the nano-sized carbon structure material provides a structure that can mitigate a volume change of silicon and thus makes it possible to increase a capacity and improve a lifespan, so that the nano-sized carbon structure material is being widely researched.

According to the recent research trend, a method of mitigating a volume change by surrounding silicon nanoparticle or nanofiber with graphene or carbon nanotube, a method of mitigating a volume change of silicon with a silicon-carbon composite prepared by depositing a carbon precursor on an outer wall of a silicon nanostructure and then carbonizing them, or a method of mitigating a volume change by positioning silicon nanoparticle or fiber within a pore structure such as a yolk-shell structure has been mainly researched.

Meanwhile, Korean Patent Laid-open Publication No. 10-2014-0026633 discloses a carbon material including carbon and silicon oxide through a spraying process of a mixture of a phenol resin and silica particles and then a thermal treatment, a negative electrode for lithium ion secondary batteries including the carbon material, a negative electrode for lithium ion secondary batteries, and a lithium ion secondary battery.

DISCLOSURE OF THE INVENTION

Problem to be Solved by the Invention

The present disclosure provides a method of preparing a carbon-silicon composite electrode material including silicon nanoparticles and an inverse opal-structured porous carbon structure, the carbon-silicon composite electrode material prepared by the method, and a secondary battery including the carbon-silicon composite electrode material.

However, problems to be solved by the present disclosure are not limited to the above-described problems, and although not described herein, other problems to be solved by the present disclosure can be clearly understood by those skilled in the art from the following descriptions.

Means for Solving the Problems

In accordance with a first aspect of the present disclosure, there is provided a method of preparing a carbon-silicon composite electrode material, including: injecting a carbon precursor resol in a nanoparticle aggregate and cross-linking them to form a composite; calcinating the composite to carbonize the carbon precursor resol in the composite with removing the nanoparticle aggregatein the composite to form a porous carbon structure; wet-mixing the carbon-silicon composite with a conductive material and a binder to obtain a carbon-silicon composite electrode material.

In accordance with a second aspect of the present disclosure, there is provided a carbon-silicon composite electrode material including silicon nanoparticles and an inverse opal-structured porous carbon structure, which is prepared by the method according to the first aspect of the present disclosure.

In accordance with a third aspect of the present disclosure, there is provided a secondary battery including an anode including the carbon-silicon composite electrode material according to the second aspect of the present disclosure, a cathode, a separator, and an electrolyte.

Effects of the Invention

According to an embodiment of the present disclosure, it is possible to prepare a carbon-silicon composite electrode material including silicon nanoparticles and an inverse opal-structured porous carbon structure by a simple method through dry- and wet-mixing processes.

According to an embodiment of the present disclosure, a secondary battery prepared using a carbon-silicon composite electrode material including silicon nanoparticles and an inverse opal-structured porous carbon structure may have excellent charge/discharge capacity and lifespan characteristics.

According to an embodiment of the present disclosure, it is possible to control the composition of a carbon-silicon composite electrode material including silicon nanoparticles and an inverse opal-structured porous carbon structure.

BEST MODE FOR CARRYING OUT THE INVENTION

Figure 1A:
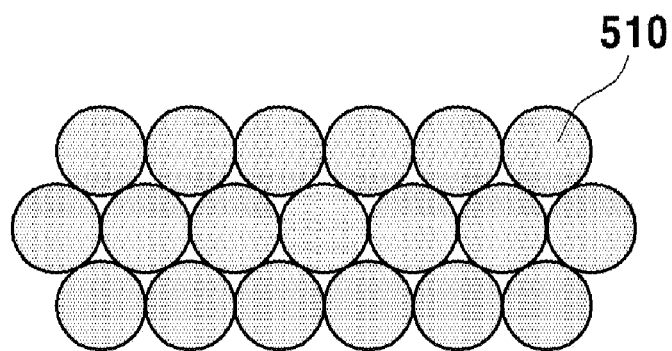
FIGS. 1A, 1B and 1C are schematic diagrams illustrating a method of preparing a porous carbon structure in accordance with an embodiment of the present disclosure.

Hereinafter, embodiments and examples of the present disclosure will be described in detail with reference to the accompanying drawings so that the present disclosure may be readily implemented by those skilled in the art. However, it is to be noted that the present disclosure is not limited to the embodiments and examples but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the another element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party.

Through the whole document, the term "step of" does not mean "step for".

Through the whole document, the term "combination(s) of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Through the whole document, the term "alkyl group" may individually include a linear or branched $C_{1-7}$ alkyl group or $C_{1-20}$ alkyl group, and may include, for example, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicodecyl, or all the possible isomers thereof, but may not be limited thereto.

Through the whole document, the term "aryl group" refers to a monovalent functional group formed by the removal of one hydrogen atom from one or more rings of arene, and may include a $C_{6-20}$ aryl group, for example, phenyl, biphenyl, terphenyl, naphthyl, anthryl, phenanthryl, pyrenyl, or all the possible isomers thereof, but may not be limited thereto. The arene may refer to a hydrocarbon group having an aromatic ring, and includes monocyclic and polycyclic hydrocarbon groups. The polycyclic hydrocarbon group includes one or more aromatic rings and includes an aromatic or non-aromatic ring as an additional ring, but may not be limited thereto.

Hereinafter, embodiments of the present disclosure will be described in detail, but the present disclosure may not be limited thereto.

In accordance with a first aspect of the present disclosure, there is provided a method of preparing a carbon-silicon composite electrode material, including: injecting a carbon precursor resol in a nanoparticle aggregate and cross-linking them to form a composite; calcinating the composite to carbonize the carbon precursor resol in the composite with removing the nanoparticle aggregatein the composite to form a porous carbon structure; dry-mixing the porous carbon structure with silicon nanoparticles to obtain a carbon-silicon composite; wet-mixing the carbon-silicon composite with a conductive material and a binder to obtain a carbon-silicon composite electrode material.

In an embodiment of the present disclosure, in an emulsion formed by including two kinds of fluids, i.e., water phase and oil phase, which are not mixed with each other, a water-in-oil droplet in which multiple nanoparticles and a carbon precursor resol are dispersed in a droplet solvent within the water phase may be formed, and the droplet solvent included in the water phase may be slowly removed from the droplet by evaporation or the like, so that an inverse opal-structured nanoparticle-carbon precursor aggregate may be formed. In an embodiment, after the multiple nanoparticles are dispersed in the droplet solvent, the carbon precursor may be mixed in the droplet solvent with stirring, and then, an emulsion may be formed by dropping the mixture dropped into oil prepared to form an oil phase and then stirred again to prepare a droplet.

The droplet may include the carbon precursor resol, and the carbon precursor resol may include a material which can be reduced to carbon through a heat treatment in a reducing atmosphere without oxygen or a carbonization process through calcination. A phase of the carbon precursor included in the droplet may be a liquid phase, but may not be limited thereto.

In an embodiment of the present disclosure, the nanoparticle aggregate may include any one of organic nanoparticles or inorganic nanoparticles, or mixed particles thereof, but may not be limited thereto. For example, the inorganic nanoparticles may include a member selected from the group consisting of silica, alumina, titania, zirconia, tin oxide, zinc oxide, and combinations thereof, but may not be limited thereto.

In an embodiment of the present disclosure, the nanoparticle aggregate may be selected from the group consisting of polystyrene, polymethylmethacrylate, polyphenylmethacrylate, polyacrylate, polyalphamethylstyrene, poly(1-methylcyclohexyl methacrylate), polycyclohexylmethacrylate, polybenzylmethacrylate, polychlorobenzylmethacrylate, poly(1-phenylcyclohexylmethacrylate), poly(1-phenylethylmethacrylate), polyfurfurylmethacrylate, poly(1,2-diphenylethylmethacrylate), polypentabromophenylmethacrylate, polydiphenylmethylmethacrylate, polypentachlorophenylmethacrylate, copolymers thereof, and combinations thereof, but may not be limited thereto.

In an embodiment of the present disclosure, the carbon precursor resol may further include a surfactant, but may not be limited thereto.

In an embodiment of the present disclosure, the carbon precursor resol may further include a block copolymer, but may not be limited thereto. The block copolymer may include, for example, a block copolymer of polyolefin, but may not be limited thereto.

In an embodiment of the present disclosure, the carbon precursor resol may be prepared by a method including: a condensation polymerization reaction of a monomer selected from the group consisting of phenol-formaldehydes, hydroquinone-formaldehydes, phloroglucinol-formaldehydes, phenols, phloroglucinols, resorcinol-formaldehydes (RF), aliphatic hydrocarbon-based or aromatic hydrocarbon-based aldehydes including 1 to 20 carbon atoms, sucrose, glucose, xylose, and combinations thereof, with using an acidic catalyst or a basic catalyst; or by an addition polymerization reaction of a monomer selected from the group consisting of divinylbenzene, acrylonitrile, vinylchloride, vinylacetate, styrene, methacrylate, methylmethacrylate, ethyleneglycol, dimethacrylate, urea, melamine, $CH_2=CRR'$ (wherein, R and R' independently represent an alkyl group having 1 to 20 carbon atoms or an aryl group having 6 to 20 carbon atoms), and combinations thereof, with using a polymerization initiator, but may not be limited thereto.

For example, the acidic catalyst may include chloric acid, sulfuric acid, phosphoric acid, formic acid, acetic acid, oxalic acid, butryc acid, lactic acid, benzenesulfonic acid, p-toluenesulfonic acid, boric acid; or a metallic salt such as zinc chloride or zinc acetate, but may not be limited thereto, and the acidic catalysts may be used solely or in combination of two or more thereof.

For example, the basic catalyst may include a hydroxide of an alkali metal such as sodium hydroxide, lithium hydroxide, or the like; a hydroxide of an alkali earth metal such as calcium hydroxide, barium hydroxide, or the like; ammonium hydroxide; or amines such as diethylamine, triethylamine, triethanolamine, ethylenediamine, hexamethylenetramine, and the like, but may not be limited thereto, the basic catalysts may be used solely or in combination of two or more thereof.

In an embodiment of the present disclosure, as the polymerization initiator, any material that makes an addition polymerization reaction can be used without limitation, and for example, the polymerization initiator may include one or more initiators selected from the group consisting of azobisisobutyronitrile (AIBN), t-butyl peracetate, benzoyl peroxide (BPO), acetyl peroxide, lauryl peroxide, or combinations thereof, but may not be limited thereto.

In an embodiment of the present disclosure, a process of heat-treating or calcining the composite in which the carbon precursor is cross-linked may be performed in a reducing atmosphere without oxygen, i.e., in an atmosphere including an inert gas such as He, Ne, or the like; or a hydrogen gas, a nitrogen gas, or a $SF_6$ gas, and by performing the heat treatment or calcination in such a reducing atmosphere, the carbon precursor included in the composite is carbonized, so that the porous carbon structure may be formed. Depending on the kind of a carbon precursor material, a temperature of the heat treatment or calcination in the reducing atmosphere may be selected from a range in which the carbon precursor material can be carbonized, and a time of the heat treatment or calcination in the reducing atmosphere is not specifically limited and may be selected appropriately from a range in which all the carbon precursor material can be carbonized. For example, the temperature of the heat treatment or calcination in the reducing atmosphere may be from about 500° C. to about 1,200° C., from about 700° C. to about 1,100° C., or from about 800° C. to about 1,000° C., and the time of the heat treatment or calcination may be about 1 hour or more, for example, in a range of from about 1 hour to about 10 hours, but may not be limited thereto.

FIG. 1 is a schematic diagram illustrating a method of preparing a porous carbon structure in accordance with an embodiment of the present disclosure. Hereinafter, an embodiment of the present disclosure will be described in detail with reference to FIG. 1.

Figure 1B:
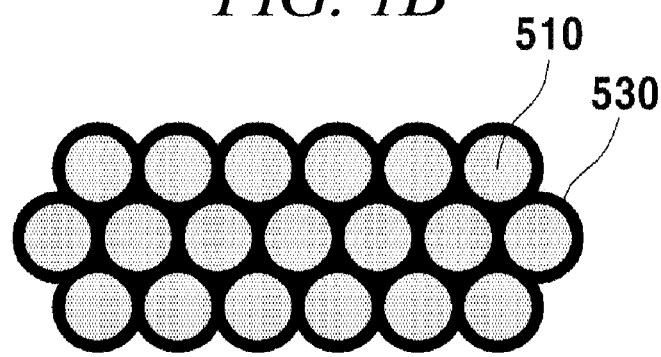
Figure 1C:
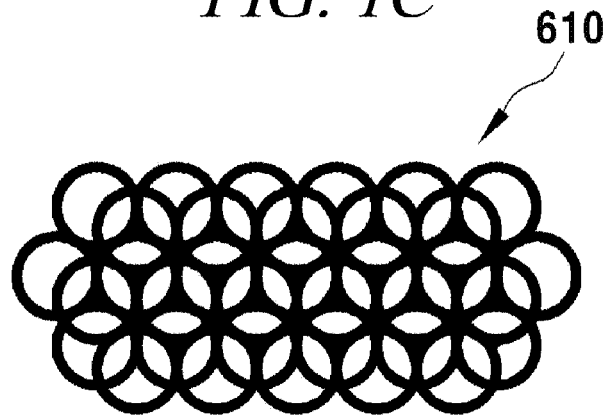

Referring to FIG. 1, a surface of an opal-structured nanoparticle aggregate 510 (FIG. 1A) may be coated with a carbon precursor resol 530 by permeating a solution containing the carbon precursor resol 530 into the nanoparticle aggregate 510, and then, the carbon precursor resol 530 may be cross-linked (FIG. 1B), and a porous carbon structure 610 having an inverse opal structure may be prepared by carbonizing the cross-linked carbon precursor resol 530 through a heat treatment or calcination and removing the nanoparticle aggregate 510 (FIG. 1C).

In an embodiment of the present disclosure, the porous carbon structure may have an inverse opal structure, but may not be limited thereto.

In an embodiment of the present disclosure, the porous carbon structure may include a three-dimensional pore array, but may not be limited thereto. The pore is a space where the nanoparticle aggregate included in the spherical nanoparticle-carbon precursor composite was located, and the pore is formed by removing the nanoparticle aggregate. Meanwhile, a pore tunnel may be formed between the pore and the pore, and when a solvent is removed by using a droplet and the spherical nanoparticle-carbon precursor composite is thus formed by self-assembly, the carbon precursor resol cannot permeate into a contact surface between the nanoparticles, and, thus, the pore tunnel may be formed by removing the nanoparticles.

In an embodiment of the present disclosure, the removing of the nanoparticles included in the nanoparticle-carbon aggregate having an inverse opal structure may include removing of the nanoparticles through dissolution or calcination, but may not be limited thereto.

In an embodiment of the present disclosure, the porous carbon structure may include mesopores or micropores, but may not be limited thereto.

In an embodiment of the present disclosure, a pore in the porous carbon structure may have a size of from about 1 nm to about 2 μm or from about 10 nm to about 2 μm, but may not be limited thereto. For example, a pore in the porous carbon structure may have a size of from about 1 nm to about 2 μm, from about 10 nm to about 2 μm, from about 50 nm to about 2 μm, from about 100 nm to about 2 μm, from about 200 nm to about 2 μm, from about 300 nm to about 2 μm, from about 400 nm to about 2 μm, from about 500 nm to about 2 μm, from about 600 nm to about 2 μm, from about 700 nm to about 2 μm, from about 800 nm to about 2 μm, from about 900 nm to about 2 μm, from about 1 μm to about 2 μm, from about 1.5 μm to about 2 μm, from about 1 nm to about 1 μm, from about 50 nm to about 1 μm, from about 100 nm to about 1 μm, from about 200 nm to about 1 μm, from about 300 nm to about 1 μm, from about 400 nm to about 1 μm, from about 500 nm to about 1 μm, from about 600 nm to about 1 μm, from about 700 nm to about 1 μm, from about 800 nm to about 1 μm, from about 900 nm to about 1 μm, from about 1 nm to about 900 nm, from about 1 nm to about 800 nm, from about 1 nm to about 700 nm, from about 1 nm to about 600 nm, from about 1 nm to about 500 nm, from about 1 nm to about 400 nm, from about 1 nm to about 300 nm, from about 1 nm to about 200 nm, from about 1 nm to about 100 nm, from about 1 nm to about 50 nm, from about 1 nm to about 10 nm, or from about 1 nm to about 5 nm, but may not be limited thereto.

In an embodiment of the present disclosure, pores in the porous carbon structure may be connected to each other, but may not be limited thereto. Due to the presence of the pore tunnel, the silicon nanoparticles can be mixed in the porous carbon structure.

In an embodiment of the present disclosure, a size of a pore in the porous carbon structure may be adjusted according to a size of a nanoparticle used for forming the nanoparticle aggregate. A size of the pore tunnel connecting the pores to each other may vary depending on a size of a nanoparticle used herein, a contact area between the nanoparticles, or the kind and the amount of a surfactant used herein.

In an embodiment of the present disclosure, the nanoparticle aggregate may have a structure in which nanoparticles are three-dimensionally and regularly arranged, but may not be limited thereto.

In an embodiment of the present disclosure, the silicon nanoparticle may have a size of from about 10 nm to about 200 nm, but may not be limited thereto. For example, the silicon nanoparticle may have a size of from about 10 nm to about 200 nm, from about 50 nm to about 200 nm, from about 100 nm to about 200 nm, from about 150 nm to about 200 nm, from about 10 nm to about 150 nm, from about 50 nm to about 150 nm, from about 100 nm to about 150 nm, from about 10 nm to about 100 nm, from about 50 nm to about 100 nm, or from about 10 nm to about 50 nm, but may not be limited thereto.

In an embodiment of the present disclosure, according to the method of preparing the carbon-silicon composite electrode material, the silicon nanoparticles may be located within pores of the porous carbon structure by the dry-mixing, but may not be limited thereto.

In an embodiment of the present disclosure, the wet-mixing may include a ball-milling process, but may not be limited thereto. The wet-mixing may refer to a ball-milling process using a solvent. For example, the solvent may include one or more solvents selected from the group consisting of alcohols such as ethanol, methanol, and the like; N-methyl-2-pyrrolidone (NMP), acetone, tetrahydrofuran, methylene chloride, chloroform, dimethylformamide, cyclohexane, and combinations thereof, but may not be limited thereto.

In an embodiment of the present disclosure, the method of preparing the carbon-silicon composite electrode material may further include drying the carbon-silicon composite electrode material in a solution state, which is obtained after the wet-mixing using the solvent, but may not be limited thereto.

In an embodiment of the present disclosure, the binder functions to readily bond anode active material particles to each other and also readily bond an anode active material to a current collector, and for example, the binder may include polyacrylic acid, polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluorine rubber, or various copolymers, but may not be limited thereto.

The conductive material may include a conductive material such as polyacrylic acid, acetylene black, furnace black, graphite, carbon fiber, or fullerene, but may not be limited thereto.

In accordance with a second aspect of the present disclosure, there is provided a carbon-silicon composite electrode material including silicon nanoparticles and an inverse opal-structured porous carbon structure, which is prepared by the method according to the first aspect of the present disclosure. All the descriptions of the method of preparing a carbon-silicon composite electrode material in accordance with the first aspect of the present disclosure can be applied to the carbon-silicon composite electrode material in accordance with the second aspect of the present disclosure. Detailed descriptions of parts of the second aspect, which overlap with those of the first aspect, are omitted hereinafter, but the descriptions of the first aspect of the present disclosure may be identically applied to the second aspect of the present disclosure, even though they are omitted hereinafter.

In an embodiment of the present disclosure, the silicon nanoparticles may have a size of from about 10 nm to about 200 nm, but may not be limited thereto. For example, the silicon nanoparticles may have a size of from about 10 nm to about 200 nm, from about 50 nm to about 200 nm, from about 100 nm to about 200 nm, from about 150 nm to about 200 nm, from about 10 nm to about 150 nm, from about 50 nm to about 150 nm, from about 100 nm to about 150 nm, from about 10 nm to about 100 nm, from about 50 nm to about 100 nm, or from about 10 nm to about 50 nm, but may not be limited thereto.

In an embodiment of the present disclosure, the inverse opal-structured porous carbon structure may include a three-dimensional pore array, but may not be limited thereto.

In an embodiment of the present disclosure, pores in the inverse opal-structured porous carbon structure may be connected to one another, but may not be limited thereto.

In an embodiment of the present disclosure, the inverse opal-structured porous carbon structure may include mesopores or micropores, but may not be limited thereto. A size of a pore in a particle of the porous carbon structure having an inverse opal structure may be adjusted according to a size of a nanoparticle used for forming the spherical nanoparticle aggregate. A size of a pore tunnel connecting the pores to each other may vary depending on a size of a nanoparticle used herein or a contact area between the nanoparticles.

In an embodiment of the present disclosure, a pore in the inverse opal-structured porous carbon structure may have a size of from about 1 nm to about 2 µm, but may not be limited thereto. For example, a pore in the porous carbon structure may have a size of from about 10 nm to about 2 µm, from about 50 nm to about 2 µm, from about 100 nm to about 2 µm, from about 200 nm to about 2 µm, from about 300 nm to about 2 µm, from about 400 nm to about 2 µm, from about 500 nm to about 2 µm, from about 600 nm to about 2 µm, from about 700 nm to about 2 µm, from about 800 nm to about 2 µm, from about 900 nm to about 2 µm, from about 1 µm to about 2 µm, from about 1.5 µm to about 2 µm, from about 1 nm to about 1 µm, from about 50 nm to about 1 µm, from about 100 nm to about 1 µm, from about 200 nm to about 1 µm, from about 300 nm to about 1 µm, from about 400 nm to about 1 µm, from about 500 nm to about 1 µm, from about 600 nm to about 1 µm, from about 700 nm to about 1 µm, from about 800 nm to about 1 µm, from about 900 nm to about 1 µm, from about 1 nm to about 900 nm, from about 1 nm to about 800 nm, from about 1 nm to about 700 nm, from about 1 nm to about 600 nm, from about 1 nm to about 500 nm, from about 1 nm to about 400 nm, from about 1 nm to about 300 nm, from about 1 nm to about 200 nm, from about 1 nm to about 100 nm, from about 1 nm to about 50 nm, from about 1 nm to about 10 nm, or from about 1 nm to about 5 nm, but may not be limited thereto.

In an embodiment of the present disclosure, the carbon-silicon composite electrode material may be a composition for forming an anode active material layer including a binder and a conductive material, but may not be limited thereto.

In an embodiment of the present disclosure, the binder functions to readily bond anode active material particles to each other and also readily bond an anode active material to a current collector, and for example, the binder may include polyacrylic acid, polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluorine rubber, or various copolymers, but may not be limited thereto.

The conductive material may include a conductive material such as polyacrylic acid, acetylene black, furnace black, graphite, carbon fiber, or fullerene, but may not be limited thereto.

In accordance with a third aspect of the present disclosure, there is provided a secondary battery including an anode including the carbon-silicon composite electrode material according to the second aspect of the present disclosure, a cathode, a separator, and an electrolyte.

In an embodiment of the present disclosure, the secondary battery may include a lithium-ion battery, but may not be limited thereto.

For example, the anode may be prepared by the following method, but may not be limited thereto.

Firstly, the anode may be prepared by coating and drying the carbon-silicon composite electrode material according to an embodiment of the present disclosure on an anode collector. The carbon-silicon composite electrode material may be prepared as a composition for forming an anode active material layer by mixing a carbon-silicon composite, a binder, and a solvent according to an embodiment of the present disclosure.

The binder functions to readily bond anode active material particles to each other and also readily bond an anode active material to the anode collector, and for example, the binder may include polyacrylic acid, polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluorine rubber, or various copolymers, but may not be limited thereto, but may not be limited thereto.

In an embodiment of the present disclosure, after the wet-mixing, the carbon-silicon composite electrode material may be coated on the anode collector by doctor blade, but may not be limited thereto.

The anode collector may be generally formed to a thickness of from about 3 µm to about 500 µm. The anode collector may not be particularly limited as long as it does not cause a chemical change in a corresponding battery and has conductivity, and for example, the anode collector may include: copper; stainless steel; aluminum; nickel; titanium; heat-treated carbon; or copper or stainless steel surface-treated with carbon, nickel, titanium, or silver; or aluminum-cadmium alloys, but may not be limited thereto. Further, the anode collector may increase binding power of the anode active material due to micro convexo-concave structures formed on its surface and may be used in various shapes such as film, sheet, foil, net, porous body, foamed body, or nonwoven fabric.

As the solvent, N-methyl-2-pyrrolidone (NMP), acetone, water, or mixtures thereof may be used, but the present disclosure may not be limited thereto. A content of the solvent may be from about 50 parts by weight to about 500 parts by weight with respect to 100 parts by weight of the composition for forming an anode active material layer, but may not be limited thereto. When a content of the solvent is within the above-described range, an operation for forming an active material layer can be easily performed.

The separator is not limited in kind, but may include, for example, a porous substrate prepared using a polyolefin-based polymer selected from the group consisting of ethylene homopolymers, propylene homopolymers, ethylene-butene copolymers, ethylene-hexene copolymers, and ethylene-methacrylate copolymers; a porous substrate prepared using a polymer selected from the group consisting of polyesters, polyacetals, polyamides, polycarbonates, polyimides, polyether ether ketones, polyether sulfones, polyphenylene oxides, polyphenylene sulfides, and polyethylene naphthalenes; or a porous substrate formed of a mixture of inorganic particles and a binder polymer. Particularly, in order for lithium ions in a lithium ion supply core unit to be easily transferred to an external electrode, it is desirable to use a separator formed of nonwoven fabric corresponding to the porous substrate prepared using a polymer selected from the group consisting of polyesters, polyacetals, polyamides, polycarbonates, polyimides, polyether ether ketones, polyether sulfones, polyphenylene oxides, polyphenylene sulfides, polyethylene naphthalenes, and combinations thereof.

As the electrolyte, for example, a gel-type polymer electrolyte using PEO (polyethylene oxide), PVdF (polyvinylidene fluoride), PVdF-HFP (polyvinylidene fluoride-hexafluoropropylene), PMMA [poly(methyl 2-methylpropenoate)], PAN (polyacrylonitrile), or PVAc

[poly(ethenyl ethanoate)]; or a solid electrolyte using PEO, PPO (polypropylene oxide), PEI (polyethylene imine), PES (polyethylene sulphide), or PVAc may be used. Further, as the electrolyte, a non-aqueous electrolyte using ethylene carbonate (EC), polyethylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methylacetate (MA), or methylpropionate (MP) may be used. The electrolyte may further include a lithium salt, and the lithium salt may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, or lithium tetraphenylborate.

In an embodiment of the present disclosure, the cathode may include a lithium metal or a lithium transition metal oxide, but may not be limited thereto, and all of the materials typically used in a lithium-ion battery can be applied to the cathode.

For example, the cathode may be prepared by the following method, but may not be limited thereto.

The cathode may be prepared by coating and drying a composition for forming a cathode active material layer on a cathode collector in the same manner as the above-described process of preparing the anode. The composition for forming a cathode active material layer may be prepared by mixing a cathode active material, a conductive material, a binder, and a solvent. The cathode active material may include a lithium transition metal oxide typically used as a cathode active material in a lithium battery. The conductive material, the binder, and the solvent may be used in the same kinds and amounts as used for preparing the anode. For example, the conductive material may include a conductive material such as polyacrylic acid, acetylene black, furnace black, graphite, carbon fiber, or fullerene, but may not be limited thereto.

The lithium transition metal oxide may include one or more members selected from the group consisting of $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiNi_{1-Y}Co_YO_2$ (herein, 0≤Y<1), $LiCo_{1-Y}Mn_YO_2$ (herein, 0≤Y<1), $LiNi_{1-Y}Mn_YO_2$ (herein, 0≤Y<1), $LiMn_{2-Z}Ni_ZO_4$ (herein, 0<Z<2), $LiMn_{2-Z}Co_ZO_4$ (herein, 0<Z<2), $LiCoPO_4$, and $LiFePO_4$, but may not be limited thereto.

The cathode collector may have a thickness of from about 3 μm to about 500 μm, and the cathode collector may not be particularly limited as long as it does not cause a chemical change in a corresponding battery and has a high conductivity, and for example, the cathode collector may include: stainless steel; aluminum; nickel; titanium; heat-treated carbon; or aluminum or stainless steel surface-treated with carbon, nickel, titanium, or silver, but may not be limited thereto. Further, the cathode collector may increase binding power of the cathode active material due to micro convexo-concave structures formed on its surface and may have various shapes such as film, sheet, foil, net, porous body, foamed body, or nonwoven fabric.

The separator may be interposed between the anode and the cathode obtained by the above-described processes, and an electrolytic solution including an electrolyte may be supplied, so that a lithium secondary battery may be prepared.

The lithium secondary battery may be prepared by, for example, laminating the anode, the separator, and the cathode in sequence, winding or folding them and placing them in a cylindrical or square-shaped battery case or pouch, and then injecting an organic electrolytic solution into the battery case or pouch. The separator may have a pore size of from about 0.01 μm to about 10 μm and generally have a thickness of from about 5 μm to about 300 μm. As a specific example, a sheet or nonwoven fabric formed of an olefin-based polymer such as polypropylene or polyethylene or glass fiber may be used.

The electrolytic solution may include a lithium salt dissolved in an organic solvent, but may not be limited thereto. For example, the organic solvent may be selected from the group consisting of propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyl tetrahydrofuran, γ-butyrolactone, 1,3-dioxolane, 4-methyl dioxolane, N,N-dimethylformamide, dimethylacetamide, dimethyl sulfoxide, 1,4-dioxane, 1,2-dimethoxyethane, sulfolane, dichloroethane, chlorobenzene, nitrobenzene, diethylene glycol, dimethyl ether, and combinations thereof, but may not be limited thereto.

The lithium salt may be selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (herein, x and y are natural numbers), LiCl, LiI, and combinations thereof, but may not be limited thereto.

In an embodiment of the present disclosure, the secondary battery may use an organic solid electrolyte and/or an inorganic solid electrolyte together with the separator, but may not be limited thereto. If the organic solid electrolyte and/or the inorganic solid electrolyte is used, the solid electrolyte may serve as a separator in some cases, and, thus, the above-described separator may not be used.

The organic solid electrolyte may include, for example, polyethylene derivatives, polyethylene oxide derivatives, polypropylene oxide derivatives, phosphoric acid ester polymers, polyvinyl alcohol, or polyvinylidene fluoride, but may not be limited thereto. The inorganic solid electrolyte may include, for example, $Li_3N$, LiI, $Li_5NI_2$, $Li_3N$—LiI—LiOH, $Li_2SiS_3$, $Li_4SiO_4$, $Li_4SiO_4$—LiI—LiOH, or $Li_3PO_4$—$Li_2S$—$SiS_2$, but may not be limited thereto.

All the descriptions of the first aspect and the second aspect of the present disclosure can be applied to the third aspect of the present disclosure.

MODE FOR CARRYING OUT THE INVENTION

Hereinafter, the present disclosure will be described in more detail with reference to Examples, but the present disclosure may not be limited thereto.

Examples

In the present Example, a porous carbon structure having an inverse opal carbon structure was formed by uniformly permeating formaldehyde resol into a uniform three-dimensional polystyrene support, and silicon nanoparticles were located within pores of the inverse opal carbon structure by simple dry- and wet-mixing methods. According to a mass ratio of the silicon nanoparticles and the inverse opal carbon structure, charge/discharge capacity and lifespan characteristics were controlled and analyzed.

Firstly, the uniform three-dimensional polystyrene support was formed by dispersion polymerization. A polystyrene polymer was prepared by adding azobisisobutyronitrile as an initiator into a solution in which polyvinylpyrrolidone (PVP) as a surfactant, ethanol, and styrene were mixed and performing polymerization at 80° C. The prepared polystyrene polymer was washed several times and then dried, so that the uniform three-dimensional polystyrene support was formed.

Phenol-formaldehyde resol was prepared using phenol, formaldehyde, and sodium hydroxide catalyst. The phenol-formaldehyde resol was obtained by reacting a 13 mmol formaldehyde solution having 37 parts by weight with a 20% sodium hydroxide catalyst and a 6.50 mmol phenol solution at 70° C. for 1 hour. After the reaction was completed, the phenol-formaldehyde resol was cooled at room temperature and then dropped at pH 7 and completely dried in a vacuum oven.

The completely dried phenol-formaldehyde resol was mixed with F-127 of the same mass as 0.1 M HCl and then diluted with ethanol and injected into the prepared polystyrene support and then completely dried. The F-127 functioned as a weak support in the inverse opal carbon and thus formed mesopores.

The polystyrene support injected with the phenol-formaldehyde resol was cross-linked at 100° C. and 140° C., and heat-treated at 450° C. and 900° C. in an argon (Ar) atmosphere to be completely carbonized, so that the inverse opal-structured porous carbon structure was formed.

Figure 2:
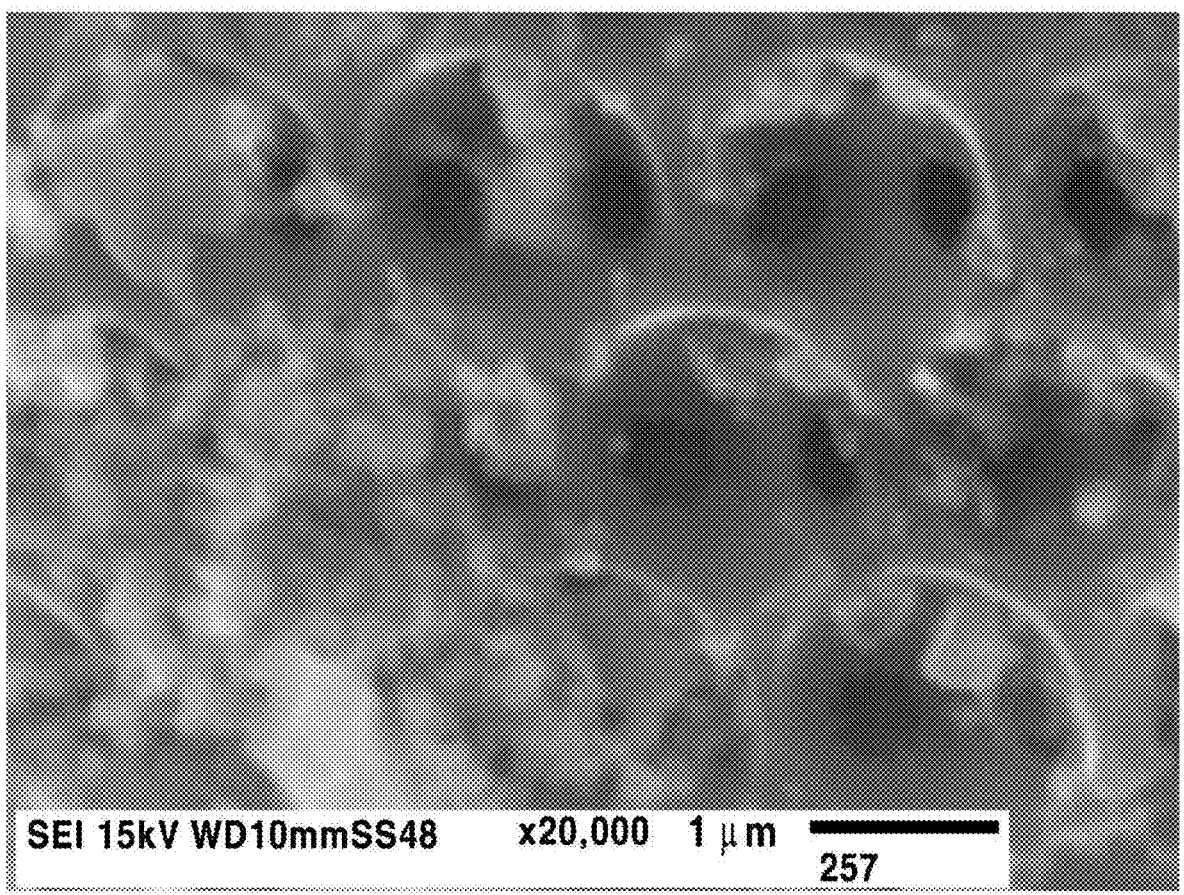
FIG. 2 is an electron microscopy image showing a cross section of a carbon-silicon composite electrode material in accordance with an example of the present disclosure.

The porous carbon structure and silicon nanopowder were mixed at a mass ratio of 8:2 (Example 1) and 6:4 (Example 2), respectively, and then, dry-mixing was performed using a mortar. An electron microscopy image of a carbon-silicon composite obtained after the dry-mixing showed that silicon nanoparticles were located between pores of the inverse opal carbon structure (FIG. 2).

Figure 3:
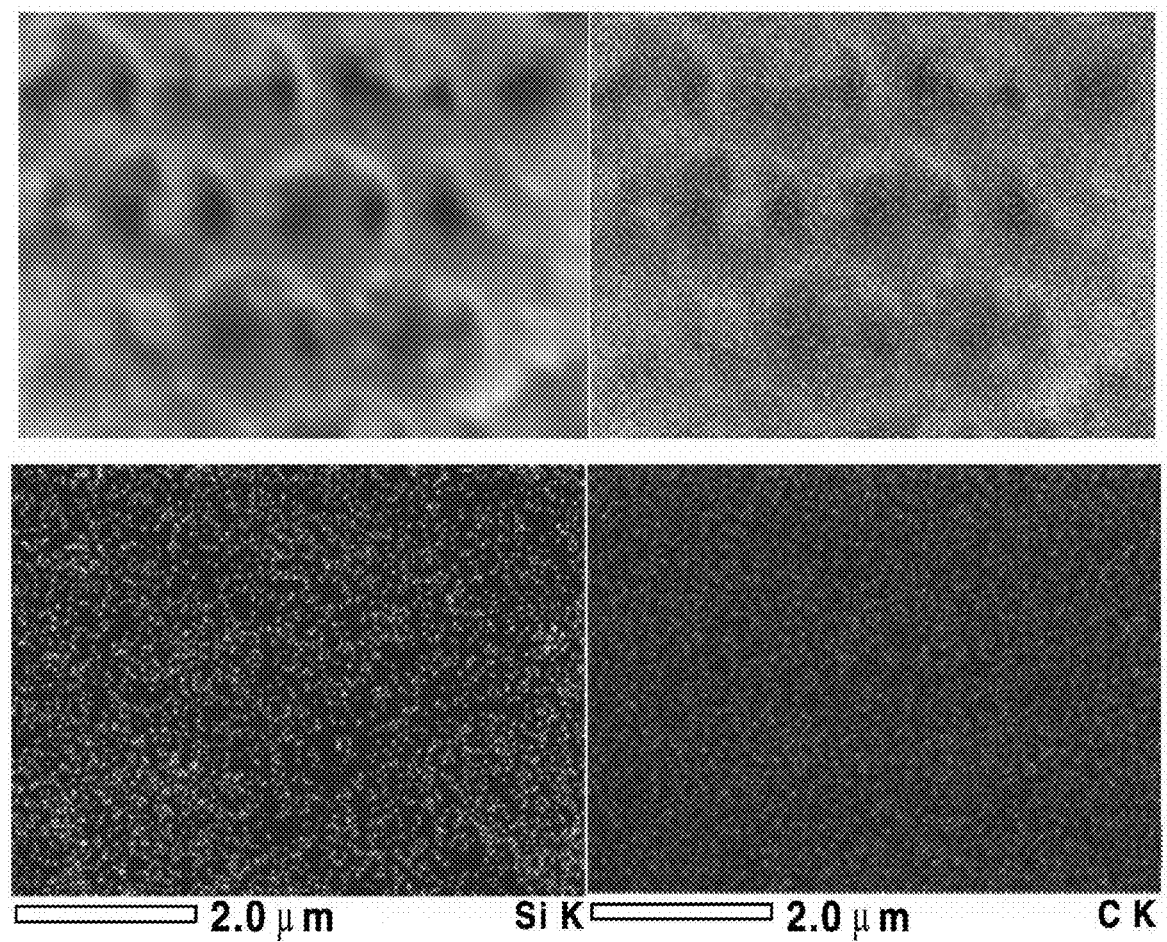
FIG. 3 is an energy-dispersive X-ray spectroscopy (EDX) image of a cross section of a carbon-silicon composite electrode material in accordance with an example of the present disclosure.

Through the energy-dispersive X-ray spectroscopy (EDX) measurement, it could be observed more clearly that silicon was located between the inverse opal carbon structure (FIG. 3). A red area indicates the inverse opal carbon structure, and an area displayed in green indicates a position of the silicon nanoparticles. Through the X-ray microanalysis, it was confirmed that the silicon nanoparticles were uniformly located within the pores.

Figure 4:
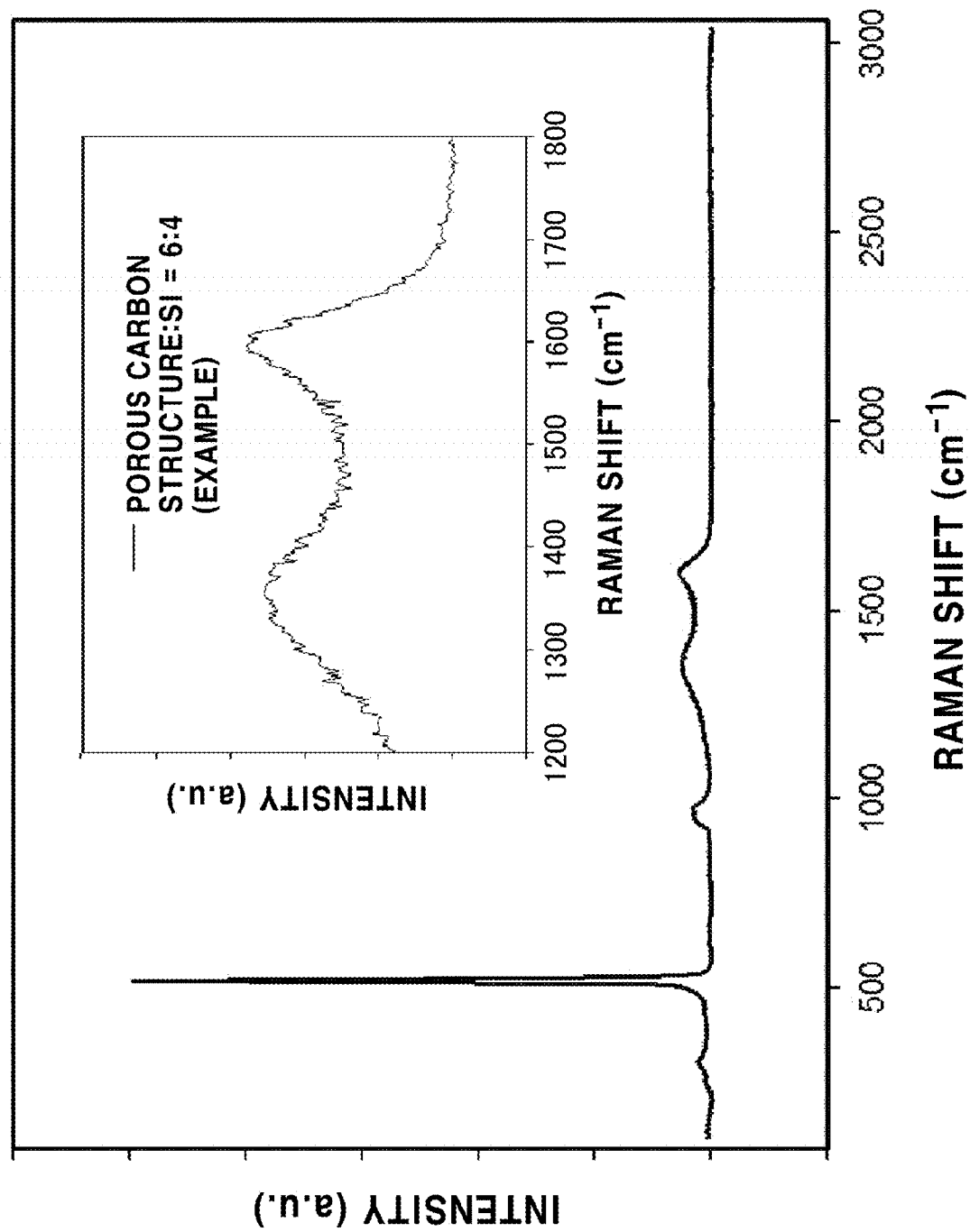
FIG. 4 shows the result of Raman spectroscopy analysis of a carbon-silicon composite electrode material in accordance with an example of the present disclosure.

FIG. 4 is a Raman spectroscopy spectrum of a carbon-silicon composite electrode material in accordance with an example of the present disclosure, and a strong peak at 515 $cm^{-1}$ and a weak peak at 960 $cm^{-1}$ shows a crystalline silicon structure, which confirms the presence of silicon. Further, peaks at 1,350 $cm^{-1}$ and 1,590 $cm^{-1}$ are relevant to three-dimensional inverse opal-structured carbon and indicate a D-band and a G-band, respectively, and a peak ratio of the D-band and the G-band was 0.928, which confirmed that the three-dimensional inverse opal-structured carbon was amorphous.

The carbon-silicon composite obtained after the dry-mixing was mixed with a conductive material and polyacrylic acid as a binder, and by performing wet-mixing through a ball-milling process with ethanol, a carbon-silicon composite electrode material was obtained.

The carbon-silicon composite electrode material solution completely mixed through dry- and wet-mixing was formed into an electrode film having a uniform thickness on a copper current collector using a doctor blade. The thickness of the electrode could be controlled according to a size of a groove in the doctor blade. The carbon-silicon composite electrode material film on the copper current collector was completed by completely drying the carbon-silicon composite electrode material film in an oven.

The prepared electrode was completely pressed using a roll presser and then used for manufacturing a coin-cell lithium-ion battery. The electrode including a coin-cell (CR 2032) kit, a separator (Celgard 2400), and ethylene carbonate (EC), ethylmethyl carbonate (EMC) and dimethyl carbonate (DMC) mixed in 1 M lithium hexafluorophosphate ($LiPF_6$) as an electrolyte was used for manufacturing a lithium-ion battery.

Figure 5:
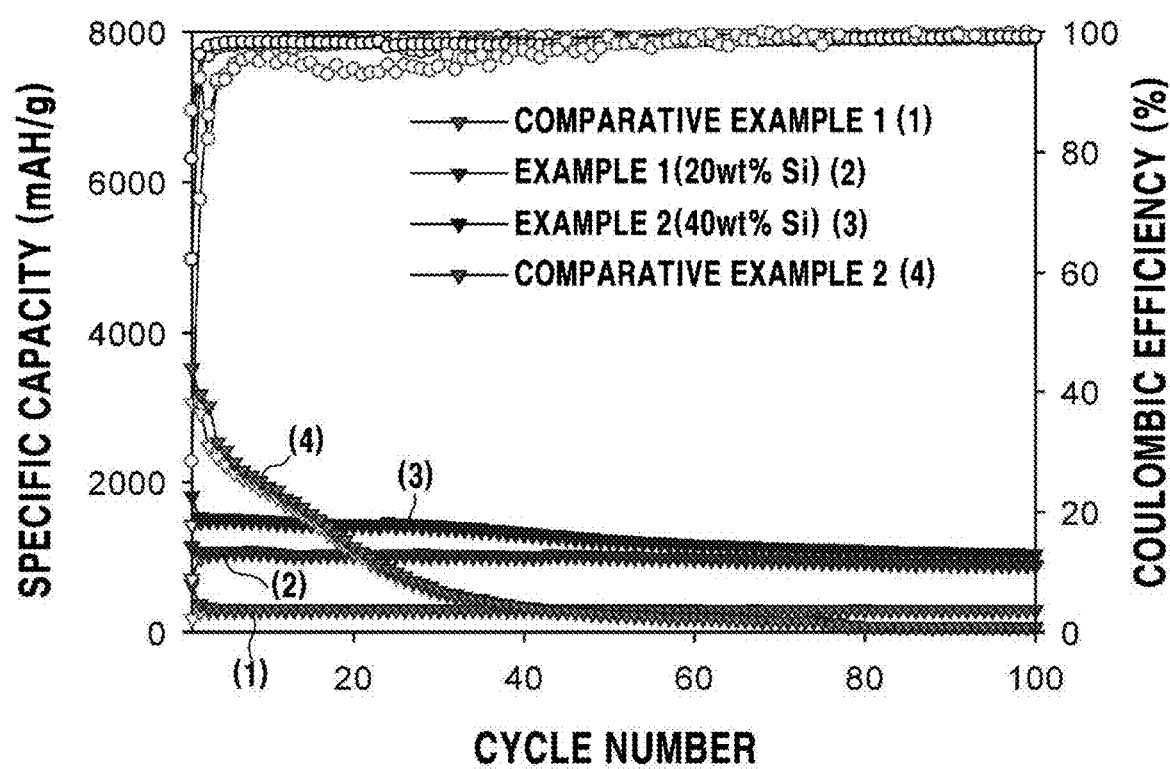
FIG. 5 is a graph showing the result of measurement of charge/discharge capacity and lifespan of Comparative Examples and carbon-silicon composite electrodes in accordance with an example of the present disclosure.

As shown in FIG. 5, the charge/discharge capacity and the lifespan of the lithium-ion battery were measured through several cycles of charge and discharge in a constant current condition of 100 mA/g for the composite according to the present Examples. In in FIG. 5, a three-dimensional porous inverse opal carbon electrode without silicon was used as Comparative Example 1 and silicon nanoparticles were used as Comparative Example 2 in order to check an effect of silicon-inverse opal carbon composite material as a lithium-ion battery electrode, and the charge capacity, and thus, the discharge capacity and the lifespan for Comparative Examples and the carbon-silicon composite electrode material according to the present Examples were measured.

From FIG. 5, it was confirmed that the charge and discharge capacity of the carbon-silicon composite electrode material of the present Examples was maintained to be about 1,044 mAh/g by repeating the cycles of charge and discharge 100 times, which is higher than those of the Comparative Examples. On contrary, it was confirmed form FIG. 5 that the charge and discharge capacity of Comparative Examples was lowered to be about 300 mAh/g after repeated charge and discharge.

The above description of the present disclosure is provided for the purpose of illustration, and it would be understood by those skilled in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

EXPLANATION OF REFERENCE NUMERALS

510: Nanoparticle aggregate
530: Carbon precursor resol
610: Porous carbon structure

I claim:
1. A method of preparing a secondary battery comprising a carbon-silicon composite electrode, said method comprising the steps of:
   1) preparing a carbon-silicon composite electrode material, comprising:
      a) injecting a carbon precursor resol in a nanoparticle aggregate and cross-linking the resol and the aggregate to form a composite;
      b) calcinating the composite to carbonize the carbon precursor resol in the composite and removing the nanoparticle aggregate in the composite to form a porous carbon structure with an array of three-dimensionally connected pores;

c) dry-mixing the porous carbon structure with silicon nanoparticles to locate said silicon nanoparticles within said three-dimensionally connected pores to obtain a carbon-silicon composite; and
d) wet-mixing the carbon-silicon composite with a conductive material and a binder to obtain a carbon-silicon composite electrode material; and 2) preparing a secondary battery using said carbon-silicon composite electrode material as an anode material.

2. The method of preparing a secondary battery comprising a carbon-silicon composite electrode of claim 1, wherein the silicon nanoparticles have a size of from 10 nm to 200 nm.

3. The method of preparing a secondary battery comprising a carbon-silicon composite electrode of claim 1, wherein the wet-mixing includes a ball-milling process.

4. The method of preparing a secondary battery comprising a carbon-silicon composite electrode of claim 1, wherein the nanoparticle aggregate has a structure in which nanoparticles are three-dimensionally and regularly arranged.

5. The method of preparing a secondary battery comprising a carbon-silicon composite electrode of claim 1, wherein the nanoparticle aggregate includes a member selected from the group consisting of polystyrene, polymethylmethacrylate, polyphenylmethacrylate, polyacrylate, polyalphamethylstyrene, poly(1-methylcyclohexyl-methacrylate), polycyclohexylmethacrylate, polybenzylmethacrylate, polychlorobenzylmethacrylate, poly(1-phenylcyclohexylmethacrylate), poly(1-phenylethylmethacrylate), polyfurfurylmethacrylate, poly(1,2-diphenylethylmethacrylate), polypentabromophenylmethacrylate, polydiphenylmethylmethacrylate, polypentachlorophenylmethacrylate, copolymers thereof, and combinations thereof.

6. The method of preparing a secondary battery comprising a carbon-silicon composite electrode of claim 1, wherein the carbon precursor resol is prepared by a condensation polymerization reaction of a monomer selected from the group consisting of phenol-formaldehydes, hydroquinone-formaldehydes, phloroglucinol-formaldehydes, phenols, phloroglucinols, resorcinol-formaldehyde (RF), aliphatic hydrocarbon-based or aromatic hydrocarbon-based aldehydes including 1 to 20 carbon atoms, sucrose, glucose, xylose, and combinations thereof, with using an acidic catalyst or a basic catalyst; or by an addition polymerization reaction of a monomer selected from the group consisting of divinylbenzene, acrylonitrile, vinylchloride, vinylacetate, styrene, methacrylate, methylmethacrylate, ethyleneglycol, dimethacrylate, urea, melamine, CH2=CRR' (wherein R and R' independently represent an alkyl group having 1 to 20 carbon atoms or an aryl group having 6 to 20 carbon atoms), and combinations thereof, with using a polymerization initiator.

7. The method of preparing a secondary battery comprising a carbon-silicon composite electrode of claim 1, wherein the porous carbon structure has an inverse opal structure.

8. The method of preparing a secondary battery comprising a carbon-silicon composite electrode of claim 7, wherein the porous carbon structure includes mesopores or micropores.

9. The method of preparing a secondary battery comprising a carbon-silicon composite electrode of claim 4, wherein the nanoparticles of the nanoparticle aggregate are three-dimensionally and regularly arranged in an opal structure.

10. A secondary battery comprising a carbon-silicon composite electrode, said secondary battery comprising silicon nanoparticles and an inverse opal-structured porous carbon structure, which is prepared by the method according to claim 1,
wherein the inverse opal-structured porous carbon structure has an array of three-dimensionally connected pores, and the silicon nanoparticles are located within the three-dimensionally connected pores.

11. The secondary battery comprising a carbon-silicon composite electrode according to claim 10, further comprising a cathode, a separator, and an electrolyte.

12. The secondary battery comprising a carbon-silicon composite electrode of claim 11, wherein the secondary battery includes a lithium-ion battery.

* * * * *